Feb. 22, 1949.  W. H. WORTHINGTON ET AL  2,462,246
HYDRAULIC POWER LIFT MECHANISM
Filed Aug. 4, 1944  6 Sheets-Sheet 1
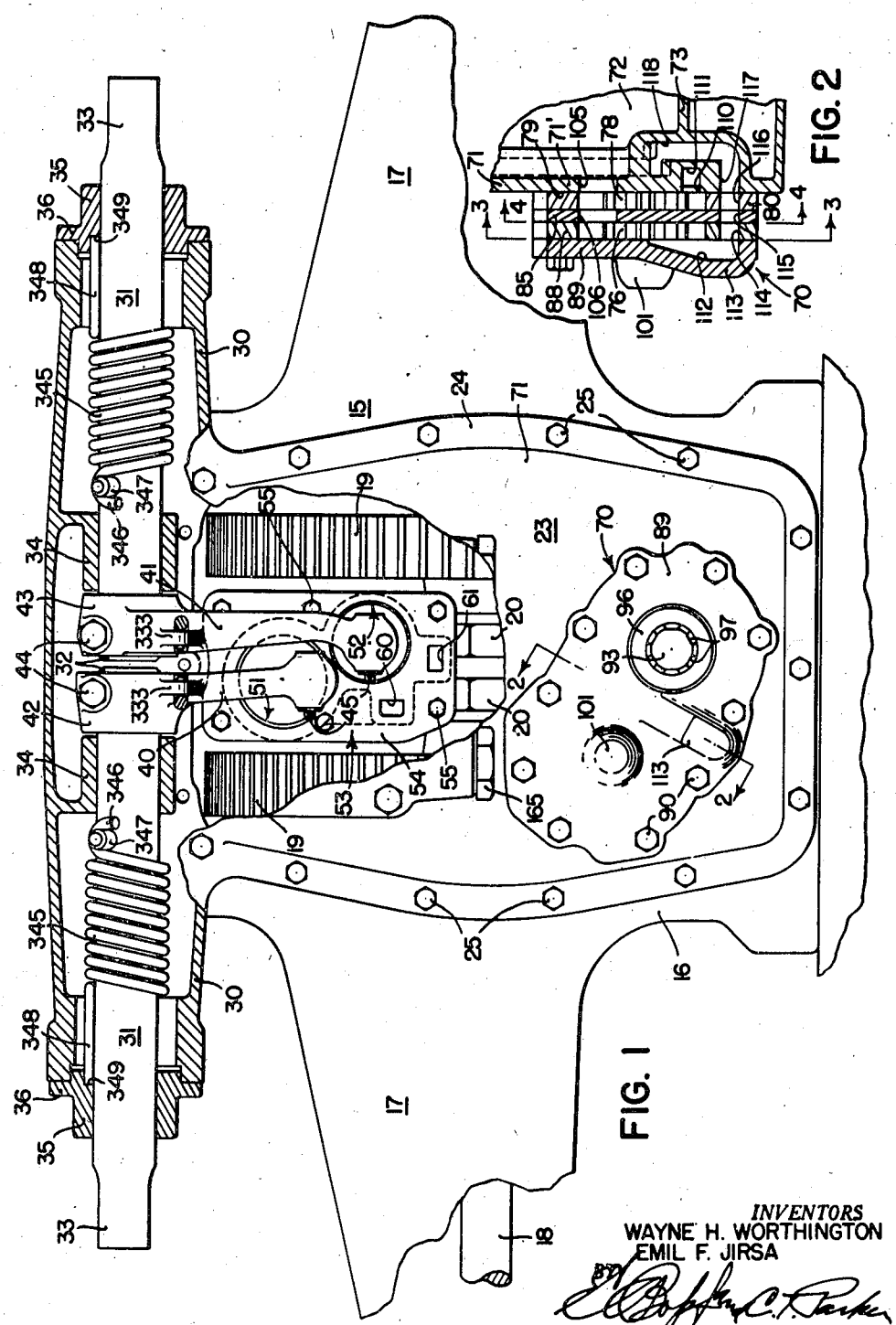
INVENTORS
WAYNE H. WORTHINGTON
EMIL F. JIRSA
ATTORNEYS

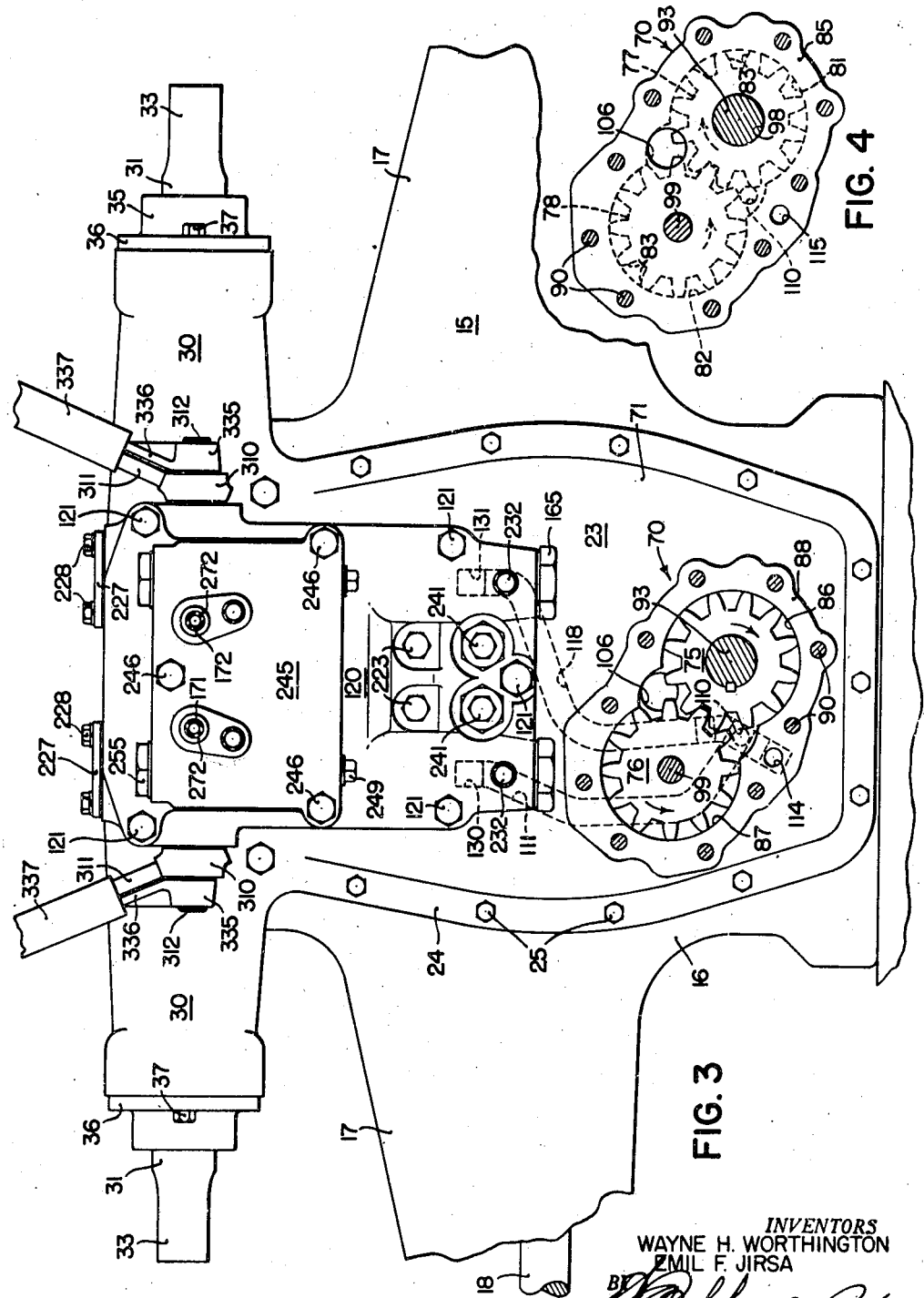

INVENTORS
WAYNE H. WORTHINGTON
EMIL F. JIRSA

ATTORNEYS

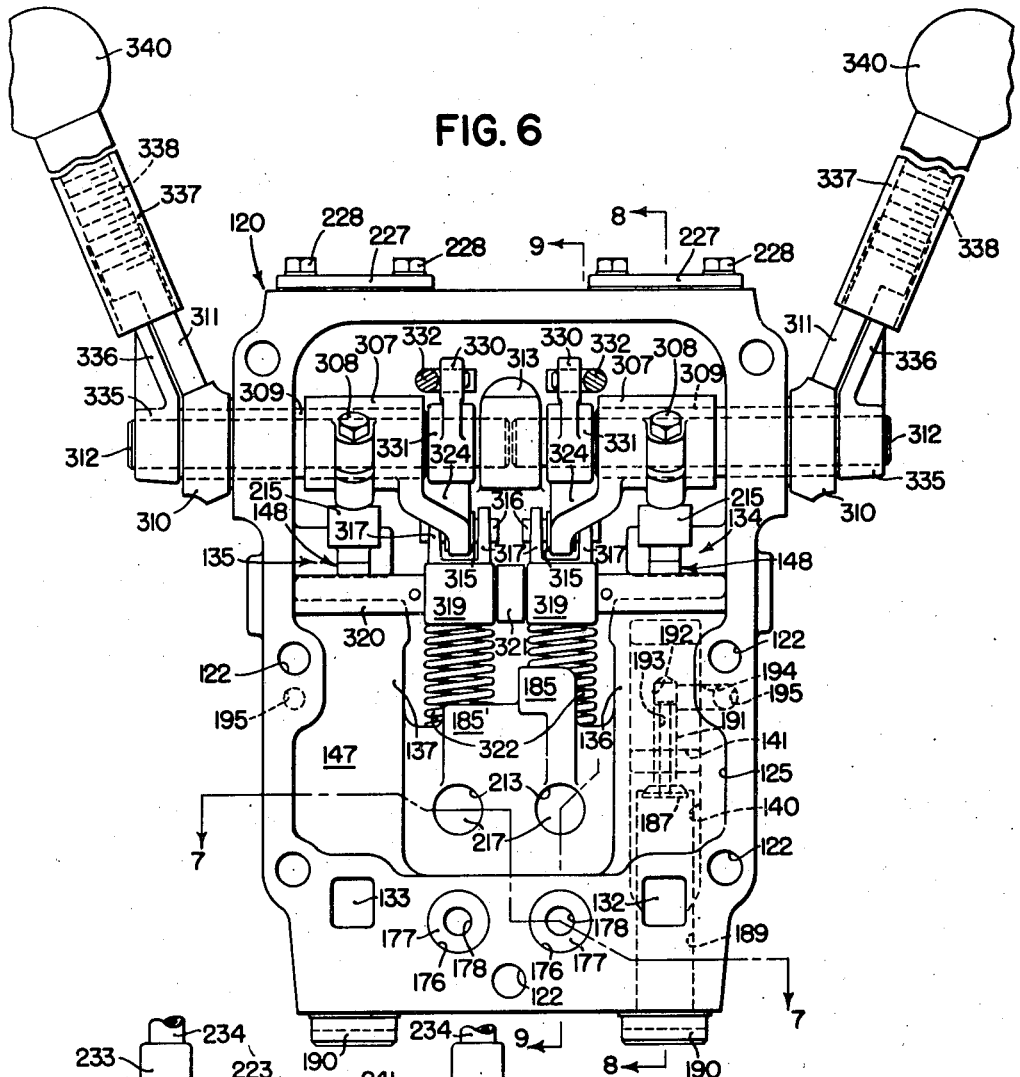
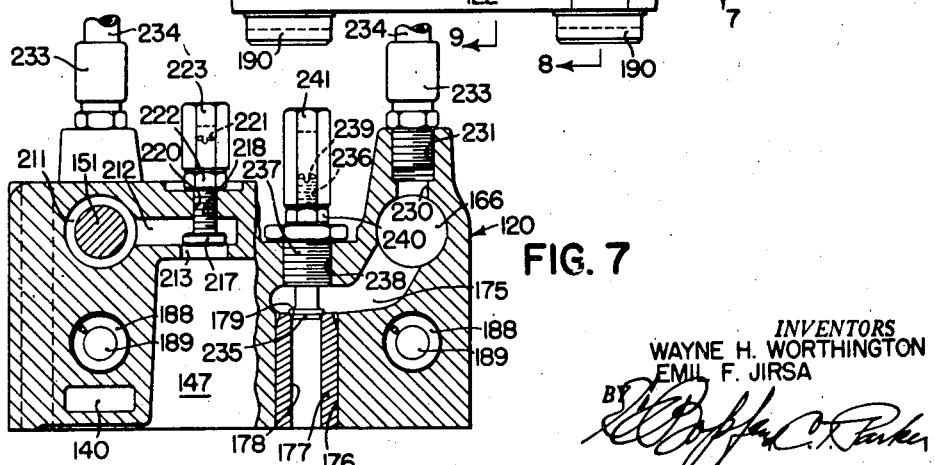

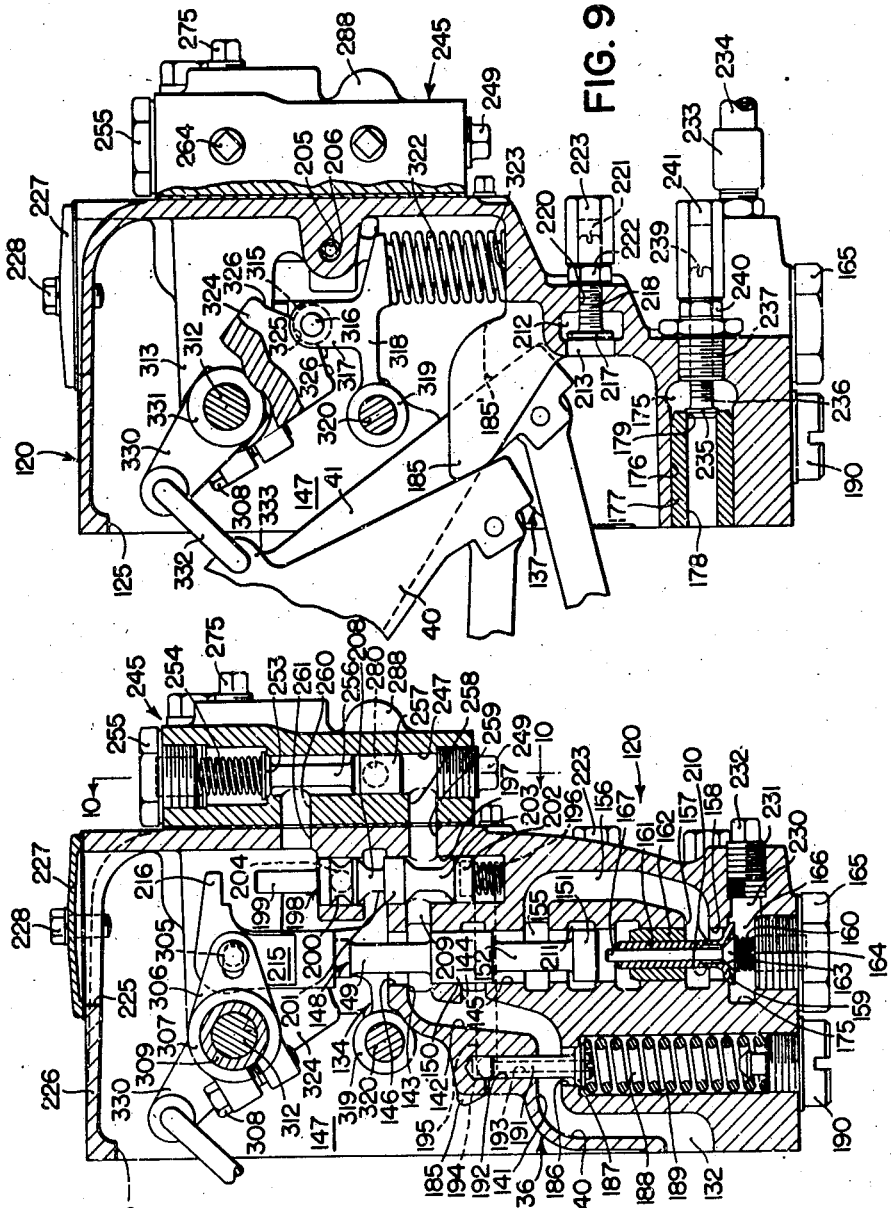

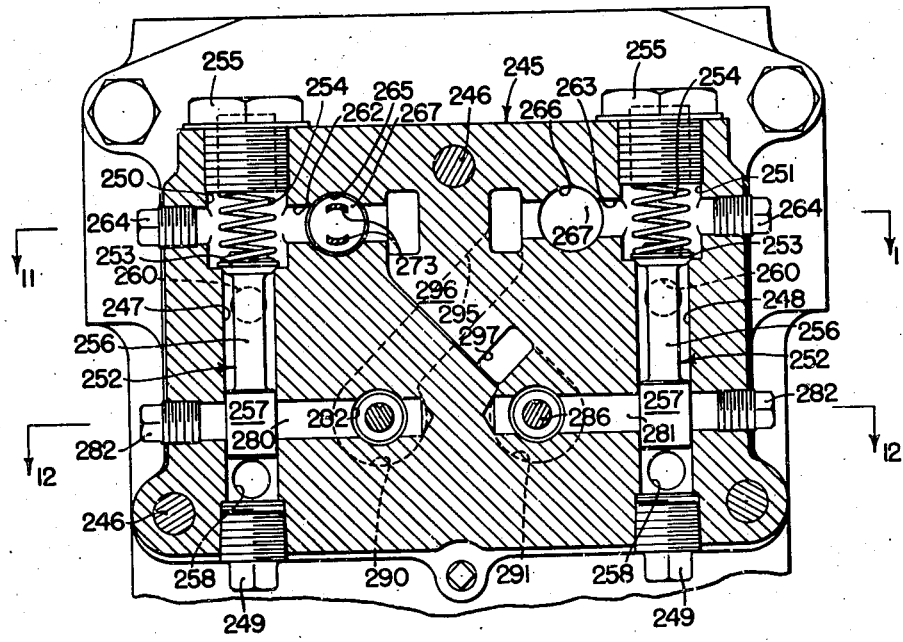
FIG. 10
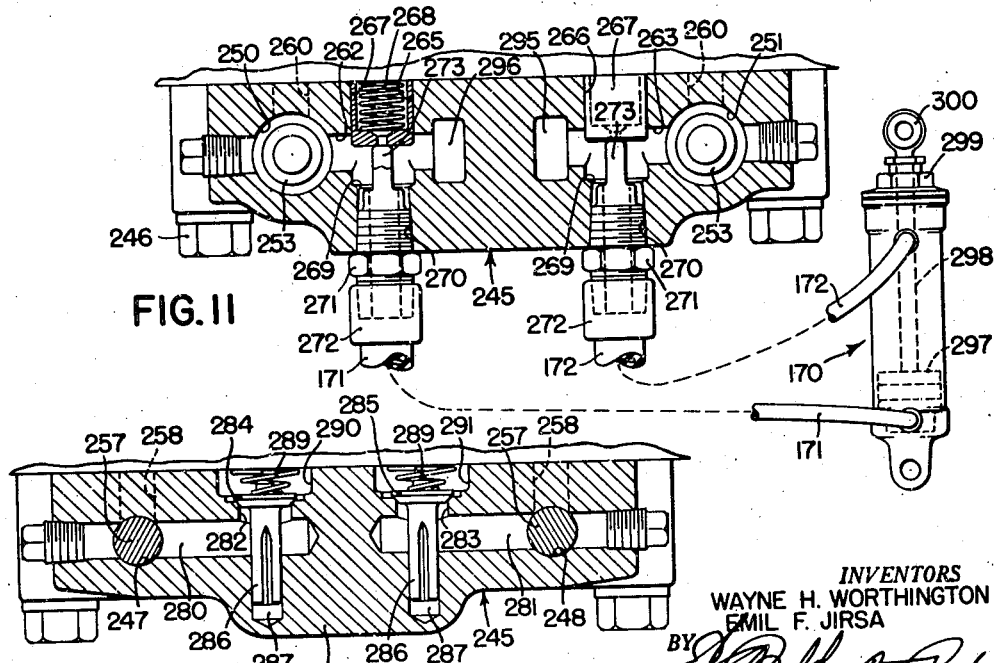
FIG. 11
FIG. 12
INVENTORS
WAYNE H. WORTHINGTON
EMIL F. JIRSA
BY
ATTORNEYS Patented Feb. 22, 1949

2,462,246

UNITED STATES PATENT OFFICE 2,462,246

HYDRAULIC POWER LIFT MECHANISM

Wayne H. Worthington and Emil F. Jirsa, Waterloo, Iowa, assignors to Deere Manufacturing Co., a corporation of Iowa Application August 4, 1944, Serial No. 548,086

7 Claims. (Cl. 60—97)

1

The present invention relates generally to hydraulic mechanism and more particularly to hydraulic power lift mechanism adapted for use on farm tractors and the like, and is in the nature of an improvement over the hydraulic mechanism shown and described in an application, Serial No. 453,907, filed August 6, 1942, by W. H. Worthington, now Patent 2,403,422, granted July 2, 1946.

The principal object of the present invention relates to the provision of a novel and improved hydraulic mechanism for independently controlling a pair of oppositely extending, coaxially disposed rockshafts, whereby a pair of implements mounted on opposite sides of the tractor, such as, for example, a two-row cultivator, may be independently raised and lowered, so that when cultivating crop rows that terminate along a line disposed at an acute angle to the rows, each cultivator can be independently raised when the latter reaches the end of the row. Conversely, the individual cultivators can be lowered at the beginning of the rows in cases where the rows on opposite sides of the tractor do not begin at the same point in the path of the tractor.

Another object of our invention relates to the provision of a hydraulic control mechanism which is provided with a pair of oppositely extending rockshafts built into the casing of the mechanism and having independent hydraulic cylinders for actuating the rockshafts, the cylinders being built in as an integral part of the mechanism, with the further provision of means for converting the control mechanism for controlling a pair of remotely positioned hydraulic cylinders when desired, and with the still further provision for converting the control mechanism for controlling a double acting hydraulic cylinder in which fluid can be applied under pressure to either end of the cylinder. A more specific object relates to the provision of an auxiliary device in the form of a valve case attachment which can be connected to the main control mechanism so that the latter can be used to control one double acting cylinder instead of two single acting cylinders.

Another more particular object relates to the provision of a novel and improved hydraulic cylinder assembly consisting of a unitary casting which contains two cylinders and the supply ducts therefor, of a shape and size which permits installing between the two drive gears on the rear axles of a tractor, within the usual banjo type axle housing. In this assembly, the two cylinders are provided with connections to the rockshafts which are so constructed and arranged

2 that although the two cylinders are of different diameters and different distances from the rockshafts, the two rockshafts are moved by the hydraulic mechanism through the same angular range and with the same lifting capacity.

Still another object relates to the provision of a novel and improved hydraulic mechanism which incorporates a dual hydraulic pump having a separate pair of pump gears for each of the two cylinders, thus providing for moving the two rockshafts at the same rate of speed, regardless of whether the rockshafts are moved simultaneously or independently. When a single hydraulic pump is used for controlling a plurality of cylinders, assuming the pump to be of the constant displacement type as is usual in this type of mechanism, the cylinders work at a faster rate of speed when one cylinder is operated independently than when more than one cylinder is operated at a time. An even more specific object of the invention relates to the provision of a novel and improved dual discharge pump which is especially compact and simple and is inexpensive to manufacture but is efficient and durable in operation.

A further object of our invention relates to the provision of a novel and improved check valve which can be manually opened against pressure with a minimum of effort.

These and other objects and advantages of our invention will be apparent to those skilled in the art after a consideration of the following description, in which reference is had to the drawings appended hereto, in which Figure 1 is a rear elevational view of the rear axle housing of a tractor equipped with hydraulic mechanism embodying the principles of the present invention, the axle housing and power lift casing being broken away to show the hydraulic cylinders, rockshafts, and connections therebetween.

Figure 2 is a sectional elevational view taken through the pump casing along a line 2—2 in Figure 1.

Figure 3 is a rear elevational view of the axle housing and hydraulic mechanism casing, showing the pump partially disassembled, that is, with the end plate removed, as indicated by a line 3—3 in Figure 2.

Figure 4 is a rear elevational view of the pump casing with the rear end plate and also the rear pump unit removed, as indicated by a line 4—4 in Figure 2.

Figure 6 is an elevational view looking toward the inner isde of the valve casing, as indicated by a line 6—6 in Figure 5.

Figure 7 is a plan view taken in section along a line 7—7 in Figure 6.

Figure 8 is a sectional elevational view taken through the valve casing along a line 8—8 in Figure 6.

Figure 9 is a similar sectional elevational view taken along a line 9—9 in Figure 6.

Figure 10 is a rear elevational view taken through the auxiliary valve casing along a line 10—10 in Figure 8.

Figure 11 is a sectional plan view taken along a line 11—11 in Figure 10.

Figure 12 is a sectional plan view taken along a line 12—12 in Figure 10.

Figure 5:
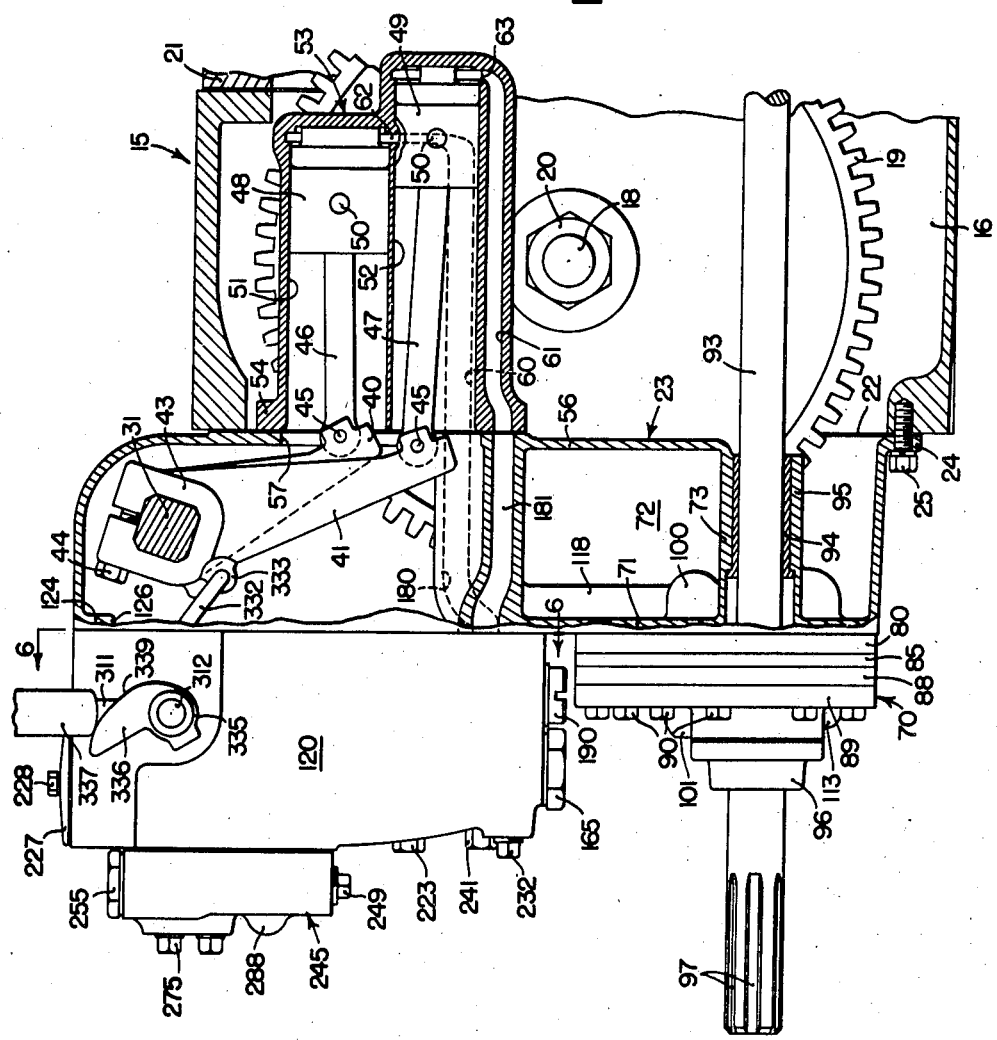
Figure 5 is a side elevational view of the axle housing and hydraulic mechanism casing, partially drawn in section.

Referring now to the drawings, the rear axle housing of the tractor is of a conventional banjo type and is indicated in its entirety by reference numeral 15, and comprises a centrally disposed enlarged gear chamber 16 and a pair of laterally oppositely extending axle housings or quills 17, within which are disposed a pair of conventional drive axles 18. The inner ends of the two axles 18 terminate in laterally spaced relation and each of the axles 18 is provided with a large drive gear 19, the two gears 19 being rigidly fixed adjacent the inner ends of the axles 18 and secured to the latter by nuts 20. The drive gears 19 are spaced apart laterally and mesh with driving gears (not shown) disposed within a tractor transmission housing 21 (Figure 5) ahead of the axle housing 15, the driving gears being suitably connected to a tractor engine through differential gear mechanism, none of which forms any part of the present invention and is therefore not shown herein, although the details of a transmission of this type are found in Patent 2,103,543, granted to McCormick and Worthington, December 28, 1937. The central gear chamber 16 is provided with a large opening 22 in the rear side thereof to provide access to the gears 19 and nuts 20 and this opening 22 is sometimes covered by a cover plate that is dished out rearwardly to accommodate the gears 19 which extend rearwardly through the opening 22, as shown in the above-mentioned patent. According to the present invention, however, the opening 22 is covered by a power lift casing 23 in the form of a casting having a peripherally extending flange 24 which fits over the housing opening 22 and is secured to the latter by a series of cap screws 25.

The upper portion of the casing 23 is provided with a pair of laterally oppositely extending tubular arms 30, within which are journaled a pair of power lift rockshafts 31, which are coaxially disposed with their inner ends spaced closely together and their outer ends extending outwardly through the ends of the tubular arms 30. The rockshafts 31 are cylindrical throughout except for the inner and outer ends 32, 33 which are of substantially square cross section, the outer ends 33 being adapted to carry suitable lifting arms (not shown), to which implements associated with the tractor can be connected for transmitting lifting force thereto. A pair of bearing hubs 34 are cast integral with the casing 23 in laterally spaced relation and support the inner ends of the rockshafts 31 for rocking movement within the arms 30. The outer ends of the rockshafts 31 are journaled in a pair of closure bushings 35, which are provided with mounting flanges 36, the latter being secured to the ends of the tubular arms 30 by suitable cap screws 37 (Figure 3).

The rockshafts 31 are rocked about their common axis, by means of a pair of actuating arms 40, 41, respectively, which are supported on hubs 42, 43, which are tightly clamped on the inner squared ends 32 of the rockshafts 31 by means of cap screws 44. The arms 40, 41 extend downwardly from the inner ends of the rockshafts in a side-by-side relation, the lower ends of the arms being swingably connected by pins 45 to a pair of piston rods 46, 47, respectively. The latter extend forwardly through the rear opening 22 in the axle gear chamber 16 and are swingably connected at their forward ends to pistons 48, 49 by suitable wrist pins 50. The two pistons 48, 49 are slidably disposed within a pair of horizontally positioned cylinders 51, 52, formed in a unitary cylinder casting 53, which lies between the two drive gears 19 within the chamber 16 and above the axles 18. The cylinder casting 53 is provided at its rear end with a supporting flange 54, which is rigidly mounted by means of suitable cap screws 55 on the front wall 56 of the power lift casing 23. The rear ends of the cylinders 51, 52 are open and register with an opening 57 in the front wall 56, through which aligned openings the piston rods 46, 47 extend.

Inasmuch as the lateral space between the gears 19 and also the vertical space between the nuts 20 and the top of the banjo housing 15 is of extremely limited dimensions, it was necessary to design the cylinder casting 53 in a unique form in order to accommodate two lifting cylinders of sufficient capacity to provide the desired lifting torque at the rockshafts 31. Thus, by virtue of the narrow space between the gears 19, the two cylinders 51, 52 are spaced vertically from each other with the result that the lower cylinder 52 is obviously a greater distance from the axis of the rockshafts 31 than is the upper cylinder 51. Therefore, one of the actuating arms 41, for the lower piston rod 47, is appreciably longer than the other actuating arm 40 which is connected to the upper piston rod 46. It is desirable, however, to provide a lifting hydraulic mechanism which applies an equal torque at the two rockshafts 31, for most tractor mounted implements adapted for mounting on the two sides of the tractor are substantially equal in weight. Furthermore, it is desirable that both rockshafts 31 be rocked at the same rate of speed in order to make the time required for lifting the implements substantially equal. To accomplish these purposes, the lower cylinder 52 was made of a smaller diameter than the upper cylinder 51 so that the area of the working face of the piston 49 multiplied by the length of the moment arm of the actuating arm 41 is equal to the area of the working face of the upper piston 48 multiplied by the length of the shorter actuating arm 40. Thus, assuming equal pressures applied to the working faces of the pistons, equal torques are applied to the rockshafts 31 by the two hydraulic motors. Furthermore, the lengths of stroke of the two pistons are made proportional to the lengths of the actuating arms 40, 41 in order that the two rockshafts will be rocked through equal angles and also to provide for equal displacements of the two pistons so that the amount of oil or other hydraulic fluid delivered to the two cylinders under equal pressures, will be equal, and therefore the time required for turning each of the rockshafts through its normal range of travel will also be equal. Hence, in this embodiment, we have made the lengths of the actuating arms 40, 41, equal respectively to the lengths of stroke of the corresponding pistons. The strokes of the two pistons are definitely limited by means of stops which will be described later.

The cylinder casting 53 also incorporates a pair of supply ducts 60, 61, which are cored into the walls of the casting and extend along the cylinders substantially parallel thereto to the forward ends thereof and communicate with the cylinders through suitable ports 62, 63 at the forward ends. As best shown in Figure 1, the supply passage 60 for the upper cylinder 51 occupies the space beneath the latter cylinder and alongside of the lower cylinder 52. This space is provided by offsetting the lower cylinder 52 to one side of the center line of the upper cylinder 51, which is made possible by the smaller diameter of the cylinder 52. The supply passage 61 for the lower cylinder 52 is disposed beneath the latter and just above the axle nuts 20.

The hydraulic fluid, preferably oil, is supplied to the cylinders under pressure by means of a pump 70 of the constant displacement type, which is mounted on the rear wall 71 of the power lift casing 23. A reservoir 72 is provided between the front and rear walls 56, 71 and the bottom of the reservoir is defined by a bottom wall 73 (see Figure 5). The pump 70 comprises two pairs of intermeshing driving and driven gears 75, 76, and 77, 78. Each pair of intermeshing gears constitutes a separate and independent pumping unit for supplying fluid to the two cylinders 51, 52, respectively. Hence, each of the two pairs of intermeshing gears is enclosed within its own separate compartment in a pump housing which comprises a series of laminations or plates, including a front or inner housing plate 71' which is actually a portion of the rear wall 71 of the power life casing 23 and has a machined rear surface 79 against which the adjacent housing plate 80 is secured. The plate 80 is annular in form, the inner portion being cut away to provide a pair of intersecting cylindrical openings 81, 82 within which are rotatably disposed the two pump gears 77, 78, respectively. The cylindrical openings 81, 82 are made of a diameter suitable for receiving the ends of the gear teeth 83 which are slidable therein, but fit closely in order to maintain a fluid pressure therebetween, as is well-known to those skilled in the art.

Adjacent the plate 80 is a partition plate 85, which lies against the plate 80 and serves as the rear wall of the compartment within which the intermeshing gears 77, 78 are rotatable, while the plate 71' serves as the forward wall of the compartment. The thickness of the annular housing plate 80 is equal to the thickness of the gears 77, 78 plus a sliding clearance, so that pressure is maintained within the pump compartment. The partition plate 85 also serves as the forward wall of the second pump compartment which is formed by a pair of intersecting cylindrical openings 86, 87 disposed within a second housing plate 88, which lies tightly against the rear face of the partition plate 85. The rear wall of the second pump compartment comprises an end plate 89, and the plates 80, 85, 88, and 89 are securely clamped together and to the rear wall 71' of the power lift casing 23 by means of suitable cap screws 90. The intermeshing gears 75, 76 are rotatable between the partition plate 85 and the end plate 89, with sliding clearance to permit rotation of the gears but preventing leakage of oil around the ends of the gear teeth and along the sides of the gears.

The two drive gears, 75, 77 are mounted on a power take-off shaft 93, which extends rearwardly from a suitable connection (not shown) with the tractor engine, through the banjo type axle housing 15 between the two gears 19 and beneath the axles 18. The power take-off shaft is journaled in a sleeve bearing 94 which is mounted within a tubular portion 95 of the casing 23 beneath the bottom wall 73 of the reservoir 72, and extends rearwardly through the end plate 89 and is journaled in a bearing 96 mounted on the rearward side of the end plate 90. The rear end of the power take-off shaft behind the bearing 96 is provided with splines 97, adapted to receive a power connection for implements associated with the tractor, as is well-known to those skilled in the art. Each of the drive gears 75, 77 is apertured to receive the power take-off shaft 93 and is suitably keyed thereon, and the partition plate 85 is provided with an aperture 98 through which the shaft 93 extends. The driven gears 76, 78 are mounted on a stub shaft 99, which is journaled at opposite ends thereof, respectively, in a pair of sockets 100, 101 (see Figures 5 and 1), preferably integrally cast within the plates 71' and 89, respectively.

Oil is drawn into the pump through an intake opening 105 in the rear wall 71' of the casing 23 and through an axially aligned opening 106 in the partition plate 85. Thus, the two pairs of gears have a common intake passage from the reservoir 72, from which the oil is trapped between the teeth of the gears during rotation of the latter and carried around the gears within the spaces between the teeth and discharged at the sides of the gears opposite the intake opening, by virtue of the meshing of the teeth which prevents the oil from carrying back to the intake, as is well-known to those skilled in the art. The oil from the forward pair of intermeshing gears 76, 78 is discharged from the compartment through an opening 110 in the casing wall 71', which communicates with a high pressure duct 111 cast integrally with the power lift casing. The oil discharged from the rear pair of gears 75, 76 is directed through a groove 112 formed within a raised portion 113 in the end plate 89, which groove communicates with an axially extending opening 114 in the annular plate 88, the latter being disposed in axial alignment with a similar opening 115 in the partition plate 85, an aperture 116 in the annular plate 80, and a port 117 in the casing wall 71'. The port 117 communicates with a high pressure duct 118, cast integrally with the casing wall and offset around the other high pressure duct 111, as best shown in Figure 2. Thus, it is evident that each of the pairs of intermeshing gears operates as an independent pumping unit which can develop pressure independently of the other, although the rates of delivery of oil from the two pumping units are equal, since the pumping units are of the constant delivery type. As will be understood later, the discharge from one of the pairs of gears 75, 76 serves the upper cylinder 51 through the high pressure supply duct 111 while the other pair of gears 77, 78 supplies the other cylinder 52 through the duct 118. The control of the two cylinders is accomplished through a dual control mechanism contained within a control casing 120 which is mounted on the rear side of the power life casing 23 by means of cap screws 121, which extend through suitable apertures 122 (see Figure 6) in the control casing 120 and engage a flange 124 (see Figure 5) in the rear side of the casing 23. The front side of the valve or control casing 120 is provided with a large opening 125 (Figure 6), which registers with a large opening 126 in the rear side of the power lift casing 23 so that the two casings are disposed in communication with each other for purposes which will appear later.

The two high pressure supply passages 117, 118 extend upwardly within the power lift housing 23 and have ports 130, 131 (Figure 3) which are disposed in register with a pair of laterally spaced ports 132, 133 in the control casing 120, respectively. The two ports 132, 133 communicate with a pair of independent valve mechanisms 134, 135, respectively, which include ducts and passages cored or drilled in portions 136, 137 of the cast housing 120 on opposite sides thereof, respectively, as best shown in Figure 6, with shiftable valve members within the passages, as will be described in detail. However, since both valve mechanisms 134, 135 are substantially identical, only one of the mechanisms 134 will be described in detail.

Referring now more particularly to Figures 6 to 9, inclusive, the port 132 in the casing 120 communicates with a supply duct 140 which extends upwardly from the port 132, turns rearwardly at 141 and then has a second vertical portion 142 extending upwardly from the rearwardly extending portion 141. Adjacent the upper end of the vertical portion 142 are a pair of rearwardly facing ports 143, 144, which communicate with a vertical valve passage 145, the upper end of which terminates in a port 146 which opens to the hollow interior 147 of the valve casing 120. Within the vertical valve passage 145 is disposed a vertically slidable valve member 148 comprising an upper stem portion 149 of reduced diameter and a pair of vertically spaced closure portions or pistons 150, 151 connected by a lower stem portion 152 of reduced diameter. In Figure 8, the valve member 148 is disposed in a neutral position in which the piston or closure portion 150 is disposed below the port 143, permitting the supply of oil from the pump to flow through the port 143 and upwardly through the exhaust port 146, into the interior 147 of the casing 120, from which the oil flows outwardly through the opening 125 in the front wall of the casing 120, and into the reservoir 72 through the opening 126 in the rear wall of the power lift casing 23. Hence, in this position of the valve member 148, the oil from the pump merely circulates at substantially no pressure.

The valve member 148 can be shifted upwardly until the piston portion 150 blocks the exhaust port 146 and at the same time uncovers the lower port 144 in the supply duct 142, thereby permitting oil to flow downwardly through the valve passage 145 to the upper port 155 of a U-shaped by-pass duct 156 which extends downwardly through the casting and has a lower port 157 communicating with the lower end of the vertical passage 145. When the valve member 148 is raised to a position blocking the exhaust port 146, the valve passage 145 is blocked by the lower piston 151 just below the port 155, so that the oil flows downwardly from the port 144 along the stem 152 and into the U-shaped by-pass duct 156, which communicates through the port 157 with a valve port 158. The valve port 158 is normally closed by a check valve 159 of the poppet type, which is urged upwardly by means of a spring 160 into seating relation in the port 158.

The poppet valve 159 is provided with an upwardly extending hollow stem 161, which is slidably mounted within a bushing 162, the latter being tightly disposed within the valve passage 145, forming a closure for the latter and thereby closing off the valve passage 145 between the upper portion and the check valve seat 158 at the lower end, although the upper and lower portions are permanently interconnected by the by-pass duct 156. The interior of the hollow stem 161 of the check valve communicates with a valve seat 163 in the head of the poppet valve 159. A small poppet valve 164 is normally held in seating relation in the seat 163 by means of the coil spring 160, which bears against the head of the valve 164 and reacts against a plug 165 which is threaded into the lower end of a chamber 166 disposed coaxially with the valve passage 145 but slightly larger in diameter. Thus, the spring 160 acting against the head of the valve 164 not only holds the latter valve against its seat 163 but also holds the check valve 159 against its seat in the end of the valve port 158 by a force transmitted through the inner seat 163. The inner valve 164 is provided with a stem 167 which is slidably disposed within the hollow stem 161 and extends upwardly beyond the end of the latter, in a position to be engaged by the lower end of the valve member 148.

The control mechanism disclosed herein is adapted to be used for controlling three different arrangements of hydraulic motors. First, each of the valve mechanisms 134, 135 can be used to control its respective integrally mounted cylinder 51, 52 for actuating the two coaxial rockshafts 31, respectively; second, each of the valve mechanisms 134, 135 is adapted to be used to control a supply of oil under pressure to an independent remotely positioned hydraulic motor (not shown); and third, the two valve mechanisms 134, 135 can be used in conjunction to control the flow of oil to the opposite ends of a double acting hydraulic motor indicated in Figure 11 by reference numeral 170, and which is positioned remotely from the valve mechanism but connected thereto by suitable flexible hoses 171, 172.

The chamber 166 is connected in communication with the integral cylinder 51 as follows: A cored passage 175 extends forwardly and inwardly from the chamber 166 and communicates with a forwardly extending passage 176 within which is tightly fixed a bushing 177 (see Figures 7 and 9). The bushing 177 is provided with a central passage 178, the rear end of which is provided with a valve seat 179 and the forward end of which is disposed in register with a cored passage 180 within the power lift casing 23 (see Figure 5). The passage 180 extends forwardly and curves upwardly through the casing 23 and has a forward end which is disposed in register with the rear end of the cylinder duct 60 which is connected through the port 62 with the front end of the upper cylinder 51. Similarly, the other bushing 177 in the valve mechanism 135 has an interior passage 178 which communicates with the cylinder duct 61 through a second cored passage 181 curving downwardly and extending forwardly through the casing 23.

Hence, when the valve member 148 is raised to block off the exhaust port 146 and connects the port 144 with the by-pass 156, the oil from the high pressure duct 142 flows downwardly through the by-pass 156, forcing the check valve 159 downwardly away from the end of the port 158, whereupon the oil flows from the chamber 166 through the passage 175, the bushing passage 178, the cored passage 180, the cylinder duct 60, and into the upper cylinder 51 through the cylinder port 62, thereby forcing the piston 48 rearwardly within the cylinder 51 and acting through the piston rod 46 and arm 40 to rock the rockshaft 31 on the left side of the tractor.

The piston 48 can be stopped at any point within its range of stroke by merely shifting the valve member 148 back to a neutral position as shown in Figure 8, whereupon the oil from the pump is again exhausted through the port 146, while the oil within the cylinder 51 is locked therein by the check valves 159 and 164. However, should the valve member 148 be left in its working position in which oil is being supplied to the cylinder 51, the latter will travel over its entire stroke until the arm 40 engages a stop 185, cast integrally with the valve casing 120 (Figures 6 and 9). This stops the rearward movement of the piston in its lifting stroke, which immediately results in a rise in pressure within the supply duct. This pressure is relieved through a relief port 186 in the portion 141 of the passage 140, which port is normally blocked by a poppet valve 187, held closed by a strong compression spring 188 disposed within a passage 189 in the casing 120. The passage 189 is disposed vertically and is closed at the bottom by means of a plug 190 threaded into the end of the passage 189. The plug 190 serves to take the reaction of the spring 188 to hold the valve closed. The valve 187 is provided with an upwardly extending stem 191 within a socket 192 and the stem 191 is provided with an axially extending opening 193 therethrough. An increase in pressure in the duct 140 forces the valve 187 downwardly away from the relief port 186 against the pressure of the spring 188, permitting the oil to flow through the port 186 into the passage 189 and from there upwardly through the hollow stem 191 into the upper end of the socket 192, which is extended beyond the end of the stem 191. The upper end of the socket 192 is connected by a transverse passage 194 with a fore and aft extending passage 195 in the side wall of the casing 120, extending rearwardly to a second transverse passage 196 connected to a vertically disposed valve passage 197. A valve member 198 is slidably disposed within the passage 197 and comprises an upper actuating stem 199, a cylindrical portion having a groove 200 extending circumferentially thereof and a pair of vertically spaced piston or closure members 201, 202 interconnected by a neck 203 of reduced diameter. A detent ball 204 engages the groove 200 and is disposed within a transverse passage 205 (Figure 9), within which is disposed a compression spring 206 serving to urge the detent ball 204 into the groove 200, and thereby to hold the valve member 198 in closed position, as indicated in Figure 8. In this position of the valve member 198, the closure member 201 blocks the passage 197, thereby preventing oil from flowing from the valve passage 145 through a short interconnecting passage 209 and upwardly through the passage 197 to the interior 147 of the casing 120. However, when the rockshaft arm 40 engages the stop 185, causing the pressure to rise in the supply duct and open the valve 187 against the spring 188, the oil flows therethrough and through the hollow stem 191 and passages 194, 195, 196, into the lower end of the valve passage 197, acting against the lower end of the closure portion 202 to force the valve member 198 upwardly until the ball detent 204 engages the valve neck 208 to hold the valve in raised position. In this position the closure portion 201 is above the opening into the interior 147 of the casing, thereby permitting the oil to flow outwardly and return to the reservoir, thereby relieving the pressure in the supply duct and allowing the spring 188 to close the valve 187. The check valves 159, 164 are closed by the spring 160 to hold the oil locked in the cylinder and thereby lock the piston 48 at the end of its raising stroke.

To return the piston to the forward end of the cylinder, the main valve member 148 is shifted downwardly beyond the neutral position shown in Figure 8, whereupon the the lower end of the valve member 148 engages the upper end of the inner valve stem 161, thereby forcing the inner valve 164 open, permitting oil to flow from the cylinder 51 upwardly through the inner seat 163 in the valve 159 and through a plurality of radially extending holes 210 in the tubular stem 161, and through the port 157 upwardly through the by-pass 156 into the valve passage 145. Since the piston 150 blocks the upper end of the passage 145, the oil flows downwardly along the neck 152 into a chamber 211. The chamber 211 is connected by a transverse passage 212 (see Figure 7), with a valve port 213 which exhausts the oil to the interior 147 of the casing 120.

Moving the valve member 148 still further downwardly, causes the end of the valve member to engage the upper end of the tubular stem 161 of the valve 159, thereby opening the latter valve and permitting the oil to flow under the main poppet valve 159. The purpose of the two concentric valves 159, 164 is to avoid the necessity for applying a heavy pressure downwardly upon the valve member 148 to force a large diameter valve open against the pressure in the cylinder 51, which is comparatively high when there is a heavy load supported on the rockshaft 31. By providing a small diameter valve 164, which is opened in advance of the main valve 159, a much lower pressure against the valve member 148 is required to relieve the pressure in the cylinder, after which the main valve 159 can be opened with comparative ease.

The valve member 148 is provided with a head 215 which has a laterally extending arm 216 engageable with the upper stem 199 on the exhaust valve member 198, to reset the latter when the main valve 148 is moved downwardly to open the check valve 164, 159. This returns the exhaust valve member 198 to its neutral position with the detent ball 204 in engagement with the groove 200, as shown in Figure 8.

A valve 217 is provided (see Figures 7 and 9), positioned in the exhaust port 213 to restrict the flow of oil from the cylinder 51 back through the port 213 into the interior 147 of the casing 120 and thus back to the reservoir 72. This valve 217 is supported on a threaded shaft 218, which extends outwardly through the rear wall of the casing 120 through a threaded opening 220, the outer end of the threaded end 218 being provided with a notch 221 adapted to receive a screw driver, for the purpose of adjusting the valve 217 inwardly or outwardly with respect to the exhaust port 213 to regulate the rate of flow of oil back to the reservoir. By this adjustment, the rate of return of the piston to the forward end of the cylinder 51 can be adjusted for the purpose of adjusting the speed of lowering of the load connected to the rockshaft 31. The valve 217 can be secured in adjusted position by means of a lock nut 222 which engages the threaded stem 218 outside of the casing 120 and this adjustment is further protected by means of a threaded cap 223 which can be screwed onto the end of the threaded stem 218.

A coil spring 345 encircles the rockshaft 31 and has one end 346 bent into a U-shape to engage a pin 347 in the rockshaft 31. The other end of the coil spring 345 is turned in a direction parallel to the axis of the rockshaft, as indicated at 348 and engages a socket 349 in the inner end of the cap 35. The spring 345 is thus stressed in torsion when the rockshaft 31 is rocked to raised position by the movement of the piston 48 rearwardly in the cylinder 51, and is available to return the rockshaft 31 to its normal or lowered position in the event that the load connected to the rockshaft is insufficient to move the piston forwardly when the valve mechanism is set to exhaust the cylinder 51.

Obviously, the return movement of the piston 48 toward the forward end of the cylinder 51 can be interrupted at any time within its stroke by returning the valve member 148 to the neutral position as shown in Figure 8, whereupon the spring 160 closes the check valves 159, 164 immediately, thereby locking any remaining oil within the cylinder 51 and stopping the piston 48. A mechanism for automatically actuating the valve member 148 to neutral position at any predetermined point in the range of movement of the piston 48 will be described later.

Access may be had to the two valve members 148, 198 on each side of the casing 120 through a pair of openings 225 in the top wall 226 of the casing 120 at opposite sides thereof, respectively, the openings 225 being covered by cover plates 227 secured to the casing by a pair of cap screws 228 engaging the top wall 226 on opposite sides of the opening 225, respectively.

An opening 230 extends rearwardly from the chamber 166 through the rear wall of the casing 120, the rear portion of the opening 230 being threaded as indicated at 231. The opening 231 is blocked by a plug 232 when the valve mechanism is being used to control the integral cylinders 51, 52 and also when the double acting cylinder 170 is connected for operation. When it is desired to operate a pair of single acting remote cylinders, however, the plugs 232 are removed and are replaced by hose connecting fittings 233 which are threaded to permit their installation in the threaded openings 231. Flexible hoses 234 are attached to the hose fittings 233 and serve to conduct fluid under pressure from the chambers 166 beneath the check valves 159, 164 to suitable single acting remote cylinders (not shown). When the remote cylinders are connected, it is desirable to render inoperative the integral cylinders 51, 52 and this is accomplished by means of valves 235 (see Figures 7 and 9), adapted to seat within the seats 179 in the rear ends of the bushings 177. Each valve 235 is supported on a threaded stem 236, which extends through a bushing 237, which screws into a threaded opening 238 in the rear wall of the casing 120 in register with the passage 176. The interior of the bushing 237 is threaded to receive the threaded stem 236, permitting the latter to be adjusted inwardly or outwardly relative to the bushing 237, to move the valve 235 into and out of blocking engagement in the seat 179. The outer end of the stem 236 is provided with a notch 239 adapted to receive a screw driver for adjusting the valve 235. When the remote cylinders are connected to the casing 120 by the fittings 233, the valves 235 should be closed by screwing the stems 233 inwardly, but when the equipment is converted for operation of the rockshafts 31, this valve 235 is backed away from the seats 179 to permit the oil to flow freely through the passage 176, in which case the threaded openings 231 are closed by the plugs 232, as indicated in Figures 3, 5 and 8. Lock nuts 240 are provided to lock the valve stems 236 in adjusted position and the stems are also protected by threaded caps 241 which screw on the ends of the stems 236.

When the control equipment is to be used in connection with a single double acting cylinder 170, both shut-off valves 235 are closed and both of the remote cylinder hose connections 233 are replaced by plugs 232. For this operation, an auxiliary valve casing 245 is mounted on the rear side of the control casing 120 and secured thereto by suitable cap screws 246. The auxiliary casing 245 is a casting in which are disposed a pair of laterally spaced vertically extending valve passages 247, 248, the lower ends of which are closed by plugs 249 and the upper ends being enlarged to form chambers 250, 251, respectively. Each of the vertical valve passages is provided with a shiftable valve member 252 comprising a poppet valve 253 adapted to block the upper end of the passage 247 or 248 and being normally urged into closed position by a compression spring 254 disposed within the chamber 250 or 251. The upper ends of the springs 254 bear against a pair of plugs 255 which are threaded into the upper ends of the chambers 250, 251, respectively. Each of the valve members 252 further includes a neck portion 256 of reduced diameter extending downwardly from the poppet valve 253 and carrying on its lower end a piston or closure portion 257. The lower end of each of the valve passages 247, 248 communicates with the respective auxiliary valve passage 197 in the valve casing 120 through a pair of fore and aft extending registering ducts 258, 259 disposed in the adjacent walls of the auxiliary casing 245 and control casing 120, respectively. The upper end of each of the valve passages 247 is connected with the interior 147 of the casing 120 by a short forwardly extending passage 260, which registers in alignment with an opening 261 in the back wall of the casing 120.

A pair of coaxially disposed transverse ducts 262, 263 are drilled inwardly from the opposite sides of the casing 245, intersecting the chambers 250 and 251, respectively. The outer ends of the ducts 262, 263 are closed by plugs 264 while the inner ends of the ducts intersect a pair of fore and aft extending passages 265, 266, within which are slidably disposed a pair of valves in the shape of thimbles 267. The thimble valves 267 are slidable from the open position shown in Figure 11 rearwardly to a closed position blocking the ducts 262, 263 and are urged toward closed position by a pair of compression springs 268, respectively. The springs 268 bear against the inside of the heads of the valves 267 and against the outer wall of the valve casing 120, which fits tightly against the auxiliary casing 245 to prevent leakage of oil from the openings 265, 266. In their closed position, the valves 267 are urged by the springs 268 into engagement with shoulders 269 on the opposite side of the ducts 262, 263. The rear ends of the passages 265, 266 are smaller in diameter and are threaded as at 270 to receive bushings 271, to which the hoses 171, 172 are connected by suitable hose connection fittings 272. The inner ends of the bushings 271 are provided with a pair of legs 273, which engage the heads of the valves 267 when the bushings 271 are screwed into the threaded openings 270, for opening the valves against the action of the springs 268. Thus, when it is desired to prepare the mechanism for operation with a double acting cylinder 170, no attention need be given the thimble valves 267, for they are automatically opened by screwing in the bushings 271. Likewise, when the mechanism is to be converted to operation of the integral cylinders or the single acting remote cylinders, the bushings 271 are removed whereupon the springs 268 close the valves 267. When the double acting cylinder 170 is not connected for operation, the bushings 271 are replaced by plugs 275, which prevent dirt from entering the threaded openings 270 and also guard against leakage of the oil outwardly past the valves 267. If desired, the auxiliary valve casing 245 can be removed entirely and the openings 259, 261 in the rear wall of the casing 120 can be plugged by any suitable means such as by threaded plugs (not shown).

In the normal position of the valve members 252, in which the poppet valves 253 are held closed by the springs 254, the valve pistons 257 at the lower ends of the valve stems 256 are disposed in a position to block transverse drilled ducts 280, 281, respectively. The outer ends of these ducts are closed by plugs 279, while the inner ends of the ducts 280, 281 connect with a pair of check valve ports 282, 283, within which are seated a pair of check valve 284, 285, respectively. The check valves are provided with stems 286, which are slidably disposed within sockets 287 which extend rearwardly into a bulge 288 in the auxiliary casing 245. The check valves are urged toward closed position by a pair of coil springs 289 which bear against the rear wall of the control casing 120. The check valves 284, 285 can be moved against the compression of the springs 289 into a pair of valve chambers 290, 291 in the form of recesses in the front wall of the auxiliary casing 245, which is tightly secured against the rear wall of the casing 120. The valve chamber 290 on the left side of the casing 245 is connected by an upwardly inclined cored passage 295 with the inner end of the upper transverse duct 263, which extends inwardly beyond the passage 266. Likewise, the valve chamber 291 on the right side of the casing 245 is connected by an upwardly inclined passage 296 with the inner end of the upper transverse duct 262, extended inwardly beyond the passage 267. The two inclined passages 295, 296 are thus disposed in crossed relation to each other but do not intersect, for the passage 296 is offset at 297.

When pressure is applied from the high pressure supply duct through the connecting ducts 258, 259 into the lower end of the vertical valve passage 247 on the left side of the casing, the pressure acts against the lower end of the valve piston 257 forcing the latter upwardly against the spring 254 until the transverse passage 280 is uncovered by the piston 257, permitting the oil to flow laterally inwardly, through the check valve port 282, forcing the valve 284 open against the action of the spring 289 into the valve chamber 290. The oil continues upwardly through the passage 295 into the duct 263, and since the poppet valve 253 in the valve passage 248 is held closed by the spring 254, the oil flows outwardly through the bushing in the opening 266 and through the connecting hose 172 to one end of the double acting cylinder 170. The cylinder 170 is provided with a piston 297 slidable therein, connected to a piston rod 298 which extends outwardly through a sealing gland 299 in the end of the cylinder and has a connecting eye 300 fixed to the outer end of the rod 298 for bolting the latter to a load which is desired to be moved by the piston. The oil flowing into the cylinder through the hose 172 forces the piston 297 downwardly as viewed in Figure 11, thereby forcing oil from the other side of the piston outwardly from the cylinder through the other hose 171 and in through the bushing 271 to the passage 265 and duct 262. The oil cannot flow downwardly through the passage 296, for the check valve 285 is closed and the piston valve 257 also closes the duct 281 and therefore the oil flows outwardly through the duct 262 into the chamber 250, and since the valve member 252 is raised by the pressure of the oil under the piston 257, the oil is free to flow downwardly into the passage 247 and out into the reservoir through the exhaust duct 260 which is aligned with the opening 261.

When the pressure is relieved from the inlet duct 259, the spring 254 closes the valve 253 and returns the piston 257 at the lower end of the stem 256 into closed position, cutting off the flow of oil through the duct 280, whereupon the piston 297 in the double acting cylinder 170 immediately stops moving.

The piston 297 can be moved in the opposite direction within the double acting cylinder 170 by applying pressure to the lower end of the valve passage 248 on the right side of the casing 245, forcing the valve piston 257 upwardly, uncovering the duct 281, whereupon the oil flows therethrough, forcing open the check valve 285 and flowing upwardly through the chamber 291 and passage 296 into the duct 262 and since the valve 253 is closed blocking the upper end of the valve passage 247, the oil flows out through the bushing 271 in the passage 265, through the hose 171 to the lower end of the cylinder 170. Upward movement of the piston 297 forces oil outwardly through the hose 172 into the casing 245 through the bushing 271, and since the oil cannot flow downwardly through the passage 295 as the latter is blocked by the check valve 284, the oil flows into the upper end of the valve passage 248, under the poppet valve 253 which is held open by the pressure under the piston 257, and flows through the exhaust duct 260 back to the reservoir.

It will be noted that when the double acting cylinder 170 is connected for operation, the shutoff valves 235 are closed to prevent oil from flowing to the integral cylinders 51, 52, and the plugs 232 are installed in the hose connecting openings 231, therefore there is no flow of oil downwardly through the main valve passage 145 when the valve member 148 is raised, hence when the valve 148 is raised to close off the exhaust opening 146, the oil flows around the valve piston 150, through the duct 209 and transversely across the vertical valve passage 197 around the valve neck 203 into the auxiliary casing 245 through the aligned openings 258, 259. This movement of the oil is interrupted by lowering the valve member 148 to uncover the exhaust opening 146, thereby relieving the pressure, whereupon the spring 254 closes the valve member 252. Attention is called to the fact that to move the piston 297 in the opposite direction, the same valve member 148 is not manipulated downwardly from the neutral position as in the operation of the integral cylinders, but rather the valve member 148 of the valve mechanism 135 on the other side of the casing 120 is raised to create pressure in the supply duct associated therewith, whereupon oil under pressure is directed into the lower end of the auxiliary valve passage 248 on the right side of the casing 245 as explained above. Thus, it is evident that the double acting cylinder piston 297 is moved in one direction by raising one of the valve members 148 and in the other direction by moving the other valve member 148 on the other side of the valve casing 120. However, in the event that one of the valve members 148 is held in raised position until the piston 297 hits the end of the cylinder 170, the pressure rises in the supply duct 140, forcing the valve 187 open against the spring 188, allowing pressure to build up under the end of the valve member 198 to force the latter upwardly and open the valve passage 197 to the interior 147 of the casing 120. Inasmuch as the detent ball 204 holds the valve member 198 in open position, it is necessary to first return this member to closed position by moving the main valve member 148 downwardly below its neutral position to engage the arm 216 with the upper end of the stem 199, before again raising this valve member 148 to effect a movement of the double acting piston 297 in the same direction.

The control mechanism for actuating the valve members 148 will now be described. Each of the valve heads 215 is pivotally connected by means of a pin 305 to an actuating arm 306 fixed to a split hub 307 which is secured by a clamping bolt 308 to a tubular shaft 309 journaled in one of the side walls of the valve casing 120. The two tubular shafts 309 are disposed coaxially in laterally spaced arrangement with their inner ends spaced apart and their outer ends extending outwardly beyond the side walls of the casing 120, each of the outer ends carrying a hub 310 rigidly fixed thereto, on which is mounted an actuating lever 311. The tubular shafts 309 are held in alignment by a pair of central control shafts 312, which are journaled in the tubular shafts 309 and have their inner ends journaled in a bearing lug 313 cast integrally with the casing 120, (see Figure 6). The inner ends of the central shafts 312 are supported in the bearing 313 in closely spaced relation, but are not interconnected and therefore the two shafts 312 are free to turn independently of each other. Thus, moving either of the levers 311 forwardly, rocks the tubular shaft 309 associated therewith in a counterclockwise direction as viewed in Figure 8, swinging the arm 306 upwardly and raising the associated valve member 148 in its passage 145, thereby creating a pressure in the associated supply duct 140. The valve member 148 is returned to a neutral position by returning the control lever 311 to a vertical position, as illustrated in Figure 5. Similarly, by swinging the control lever 311 rearwardly, the tubular shaft 309 is rocked in a clockwise direction as viewed in Figure 8, thereby swinging the arm 306 downwardly and shifting the valve member 148 downwardly in the valve passage 145 to open the check valves 159, 164 and reset the exhaust valve 198, as explained hereinabove.

The control lever 311 is yieldably retained in adjusted position by means of a detent roller 315 mounted on a stub shaft 316 which is journaled in a pair of lugs 317, the latter being formed integrally with an arm 318 carried on a hub 319 which is journaled on a shaft 320. The shaft 320 extends between the two side walls of the casing and is supported therein, the center of the shaft 320 being supported in an apertured lug 321 cast integrally with the casing 120. Each of the arms 318 extends rearwardly from the shaft 320 and bears upon a compression spring 322 which reacts upon a horizontal surface 323 (see Figure 9), within the casing 120. Thus, the pressure of the springs 322 force the arms 318 upwardly to urge the detent rollers 315 into engagement with a pair of sectors 324, which are formed integrally with the hubs 307 and curved inwardly toward each other as indicated in Figure 6 into register with the rollers 315. The edge of the sectors 324 are provided with centrally disposed notches 325 to receive the rollers 315 when the control levers 311 are in vertical or neutral position to retain them in that position, but when the levers 311 are swung either forwardly or rearwardly from neutral position the rollers 315 are forced downwardly about the axis of the supporting shaft 320, against the pressure of the springs 322, and as the tubular shafts are rocked in either direction, the rollers roll along the edge of the sectors and into engagement with one or another of a pair of notches 326 on opposite sides of the central notch 325. The notches 326 engage the rollers 315 to yieldably hold the control levers 311 in forward or rearward position.

Each of the central control shafts 312 is provided with an actuating arm 330 which is formed integrally with a hub 331 rigidly fixed to the respective shaft 312. Each of the arms 330 is connected by a swingable link 332 with a lug 333 formed integrally with the associated rockshaft arm 40 or 41. Each of the links 332 comprises a rod, the two ends of which are turned at right angles thereto and inserted through suitable apertures in the arm 330 and the lug 333, respectively. Thus it is evident that when either of the rockshafts 31 rocks, it acts through the associated link 332 to rock the associated control shaft 312 therewith. The outer end of each control shaft 312 extends beyond the adjacent hub 310 of the control lever 311 and carries a hub 335 on which is integrally formed a cam 336. Each of the cams 336 is positioned to engage a tubular sleeve 337, the interior of which is threaded as indicated at 338 (Figure 6) for adjustably receiving the control lever 311. The cam 336 has a camming surface 339 (see Figure 5), which is generally helical in shape, increasing in radial dimension in a counterclockwise direction. The camming surface 339 is adapted to engage the lower end of the sleeve 337 to return the control lever 311 to neutral position at various points in the range of movement of integral piston associated therewith. The upper ends of the sleeves 337 are provided with control handles 340 which are grasped by the operator when he swings the control levers to actuate the hydraulic mechanisms and also to rotate the sleeves 337 on the threads 338 to adjust the lower ends of the sleeves 337 relative to the cam surfaces 339.

It is evident that when the handles 340 are moved forwardly to swing the sleeves 337 and control levers 311 forwardly in a clockwise direction as viewed in Figure 5, the pistons 48, 49 are caused to move rearwardly within the cylinders, swinging the rockshafts 31 in a clockwise direction and pushing rearwardly through the links 332 to swing the control shaft 312 and its associated cam 336 in a counterclockwise direction. Then, when it is desired to lower the load by rocking the rockshafts in a counterclockwise direction, the handles 340 are shifted rearwardly, effecting a forward movement of the pistons in the cylinders, which act through the links 332 to swing the control shafts 312 in a clockwise direction until the camming surfaces 339 engage the lower ends of the sleeves 337, continued movement of the cams carrying the levers back to a vertical neutral position to stop the movement of the pistons. By screwing the sleeves 337 inwardly or outwardly on the levers 311, the amount of angular movement of the cams 336 and hence the amount of angular movement of the rockshafts can be adjustably determined so that the load will always be lowered to a determined point.

In Figure 5, the sleeve 337 is shown in its upper extremity of movement corresponding to a movement of the associated piston 49 to the forward end of the cylinder 52. However, with the piston at the other end of the cylinder, the cam 336 is swung in a counterclockwise direction away from the sleeve 337, and the latter can be screwed downwardly on the lever 311 into a position in which the cam surface 339 engages the end of the sleeve at any desired position of the piston in the intermediate portion of the cylinder. This principle is especially useful in controlling cultivators, the depth of operation of which can be accurately adjusted by turning the sleeve 337, after which the cultivators can be raised at the end of each crop row by swinging the handles 340 forwardly and then lowered at the beginning of the next row by swinging the handles rearwardly, whereupon the cam 336 returns the control lever 311 to neutral, stopping the lowering action of the cultivators at exactly the predetermined position without further attention from the operator.

This principle of preselecting the lowered position of the rockshaft is also set forth in the Worthington Patent No. 2,403,422, mentioned hereinbefore, and is also described in detail in Patent No. 2,311,516 granted to Brown and Court, February 16, 1943.

It is believed that the operation of the hydraulic mechanism has been clearly explained above in connection with the various parts of the system and therefore a repetition of the explanation is not considered necessary. It might be well to point out, however, that Figures 5 and 8 show the mechanism prepared for operation of the integral cylinders 51, 52, since the plugs 232 and 275 are shown installed in place of the hose connections 234, 271 to the single acting remote cylinders and the double acting cylinder 170. Figures 7 and 9 show the mechanism prepared for operation of the two single acting remote cylinders by showing the connecting hoses 234, while the valves 235 are shown closed and the plugs 275 are shown installed. Figures 3 and 11 show the mechanism prepared for operation of the double acting cylinder 170, with the hoses 171, 172 connected to the auxiliary valve casing 245 and the plugs 232 installed. In this arrangement the shut-off valves 235 are closed also.

It is necessary when preparing for operation of any remote cylinders to adjust the sleeve 337 outwardly on the control levers 311 far enough to insure that the cams 336 do not interfere with movements of the levers. This can also be taken care of by filling the integral cylinders 51, 52 before closing the shut-off valves 235. This moves the cams 336 rearwardly far enough to avoid interference with the sleeves. The cams are, of course, locked in position when the valves 235 are closed.

We do not intend our invention to be limited to the exact details disclosed herein except as set forth in the following claims.

We claim:

1. Power lift mechanism for tractors and the like having an axle housing provided with an opening at one side and a pair of axle drive gears in said housing spaced apart in front of said opening to provide a limited space, said power lift mechanism comprising a casing adapted to be attached to said housing over said opening to form a closure therefor, a pair of lifting rockshafts journaled in said casing outside said axle housing with power receiving ends disposed in proximity to each other, a pair of motor units fixedly mounted on said casing and arranged in overlapping relation to each other to extend inwardly through the opening in said housing and into the limited space between said drive gears, one of said motor units being closer to its respective rockshaft than the other motor unit to the other rockshaft, and a pair of actuating arms of unequal length fixed to said adjacent ends and extending radially in side by side relation and connected with said motors, respectively, the shorter of said arms being connected to said closer motor, the latter having a shorter stroke but having a capacity for exerting greater force upon its associated arm, whereby the effects of the two motors on their respective rockshafts are substantially equal.

2. Power lift mechanism for tractors and the like having an axle housing provided with an opening at one side and a pair of axle drive gears in said housing spaced apart in front of said opening to provide a limited space, said power lift mechanism comprising a casing adapted to be attached to said housing over said opening to form a closure therefor, a pair of lifting rockshafts journaled in said casing outside said axle housing with power receiving ends disposed in proximity to each other, a pair of hydraulic cylinders fixedly mounted on said casing and arranged in overlapping relation to each other to extend inwardly through the opening in said housing and into the limited space between said drive gears, one of said cylinders being closer to its respective rockshaft than the other cylinder to the other rockshaft, pistons slidable in said cylinders, respectively, and a pair of actuating arms of unequal length fixed to said adjacent ends and extending radially in side by side relation and connected with said pistons, the shorter of said arms being connected to the piston in said closer cylinder, the latter having a shorter stroke than the other piston and cylinder but having a diameter sufficiently greater that the torque applied to the two rockshafts is substantially equal.

3. Power lift mechanism for tractors and the like having a transverse axle housing provided with an opening at one side and a pair of axle drive gears in said housing spaced apart laterally in front of said opening to provide a limited space therebetween, said power lift mechanism comprising a casing adapted to be attached to said housing over said opening to form a closure therefor, a pair of lifting rockshafts journaled in said casing outside said axle housing and disposed coaxially end to end, a pair of hydraulic cylinders with pistons therein, fixedly mounted on said casing and extending inwardly through the opening in said housing, one overlapping above the other, into the limited space between said drive gears and beneath the abutting ends of said rockshafts, and a pair of actuating arms of unequal length fixed to said abutting ends and extending downwardly therefrom, the shorter of said arms being connected to the piston in said upper cylinder and the longer arm being connected to the piston in said lower cylinder, the latter having a longer stroke and smaller diameter than said upper cylinder whereby the torque applied to said rockshafts is substantially equal.

4. The combination set forth in claim 3 including the further provision of supply ducts for said cylinders, the duct for the cylinder of larger diameter being disposed beneath the latter and alongside said cylinder of smaller diameter.

5. In power lift mechanism, a pair of lifting rockshafts disposed coaxially end to end, a pair of hydraulic cylinders with pistons therein disposed in juxtaposition in a compact arrangement near the adjacent ends of said rockshafts with one cylinder in overlapping relation to the other cylinder between the latter and said rockshafts, and a pair of actuating arms of unequal length fixed to the adjacent ends of said rockshafts, respectively, and extending side by side radially from said rockshafts and connected with the two pistons, the shorter of said arms being connected with the piston in said one cylinder, the latter having a shorter stroke but greater diameter than said other piston and cylinder to apply substantially equal torque at the two rockshafts.

6. In hydraulic power mechanism, a pair of rockshafts disposed coaxially with power receiving ends disposed in proximity to each other, a pair of hydraulic cylinders disposed side by side in generally parallel arrangement near the adjacent ends of said rockshafts, with one cylinder disposed between the other cylinder and said rockshafts, a pair of actuating arms of unequal lengths fixed to the adjacent ends of said rockshafts, pistons in said cylinders connected with said arms, respectively, the shorter of said arms being connected with the piston in said one cylinder, the latter having a shorter stroke but greater diameter than said other piston and cylinder to apply substantially equal torque at the two rockshafts, and supply ducts for said cylinders, the duct for the cylinder of larger diameter being disposed alongside said cylinder of smaller diameter in a compact arrangement in which the smaller cylinder and supply duct occupy a space of substantially the same width as the external diameter of the cylinder of larger diameter.

7. In a hydraulic power apparatus, a pair of rockshafts disposed coaxially with power receiving ends disposed in proximity to each other, and fluid power mechanism for rocking said rockshafts, said mechanism being compactly arranged within a space limited by the distance between two planes spaced axially relative to said rockshafts, said mechanism comprising a first cylinder of comparatively large diameter and short length disposed adjacent said power receiving ends of the rockshafts between said planes and extending generally parallel thereto, a second cylinder of comparatively small diameter but longer length disposed along the side of said first cylinder remote from said rockshafts and slightly offset from said first cylinder in a direction parallel to the axis of said rockshafts, a fluid supply duct for said first cylinder disposed along said remote side thereof and alongside said second cylinder, the latter and said duct having an overall dimension not greater than the distance between said spaced planes, a pair of comparatively short and long actuating arms fixed to said rockshafts, respectively, and extending to the ends of said cylinders, respectively, and pistons in said cylinders connected with said arms, respectively.

WAYNE H. WORTHINGTON.
EMIL F. JIRSA.

REFERENCES CITED

The following references are of record in the file of this patent:

UNITED STATES PATENTS

| Number | Name | Date |
|---|---|---|
| 598,505 | Gale | Feb. 8, 1898 |
| 2,009,137 | Kleckner | July 23, 1935 |
| 2,072,111 | Keeler | Mar. 2, 1937 |
| 2,107,760 | McCormick | Feb. 8, 1938 |
| 2,187,036 | Kerber | Jan. 16, 1940 |
| 2,221,462 | Trambly | Nov. 12, 1940 |
| 2,261,587 | Moore | Nov. 4, 1941 |
| 2,286,880 | Traut | June 16, 1942 |
| 2,308,727 | Temple | Jan. 19, 1943 |
| 2,337,638 | Brown | Dec. 28, 1943 |